(No Model.)

J. H. COX.
FRICTION CLUTCH.

No. 533,635. Patented Feb. 5, 1895.

Witnesses
CH Ford.
D. P. Wolhaupter

Inventor
J. H. Cox.
By his Attorneys,
C. A. Snow & Co.

UNITED STATES PATENT OFFICE.

JOHN H. COX, OF MOLINE, KANSAS.

FRICTION-CLUTCH.

SPECIFICATION forming part of Letters Patent No. 533,635, dated February 5, 1895.

Application filed December 9, 1892. Renewed December 18, 1894. Serial No. 532,268. (No model.)

*To all whom it may concern:*

Be it known that I, JOHN H. COX, a citizen of the United States, residing at Moline, in the county of Elk and State of Kansas, have invented a new and useful Friction-Clutch, of which the following is a specification.

This invention relates to clutches; and it has for its object to provide certain improvements in friction clutches which are adapted for use in various connections with the shafts of machinery, in order to allow a shaft to turn freely in one direction and either wholly prevent it from moving in the opposite direction, or to allow a loose pulley or other attachment to remain unaffected by the shaft when the same turns in one direction, or to be carried therewith when the shaft turns in another direction.

To this end this invention primarily contemplates certain improvements in friction clutches whereby the same are simplified and rendered more efficient in use.

With these and other objects in view which will readily appear as the nature of the invention is better understood, the same consists in the novel construction, combination and arrangement of parts hereinafter more fully described, illustrated and claimed.

Figure 1:
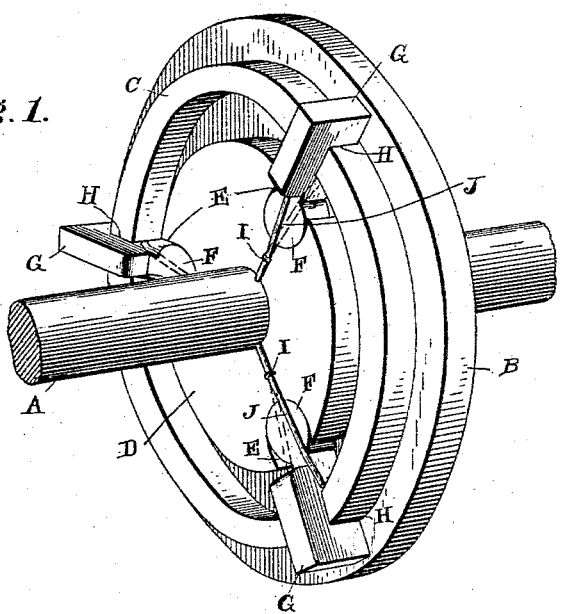
Figure 2:
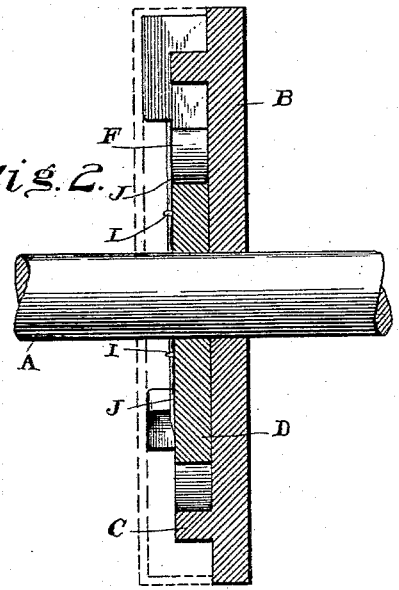
Figure 3:
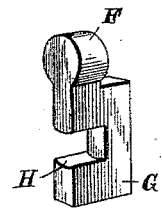

In the accompanying drawings:—Figure 1 is a perspective view of a shaft carrying clutch devices in engagement with a disk, loose on said shaft, which may represent a loose pulley or other attachment. Fig. 2 is a central longitudinal sectional view of the construction disclosed in Fig. 1. Fig. 3 is a detail in perspective of one of the friction pawls.

Referring to the accompanying drawings, A represents a shaft of any machinery on which is loosely mounted a wheel or disk B, which may represent one side of a loose pulley or other attachment mounted on said shaft, and said wheel or disk B, is provided at one side of the same with the circular flange C. The shaft A, carries therewith inside of the circular flange C, of the wheel or disk B, the hub D, which is securely keyed or fastened thereto so as to revolve in either direction therewith.

The circular hub D, is of less diameter than the flange C, and is provided with a series of rounded peripheral bearing notches E, in which loosely work the inner rounded bearing ends F, of the friction pawls G. The friction pawls G, are extended beyond their inner rounded bearing ends slightly beyond the circular flange C, and are provided upon one face, or at least in one edge thereof with the slightly curved notches or grooves H, which loosely take over or embrace the circular flange C, so that as the shaft revolves in one direction the said pawls freely travel over the circular flange C. Secured fast at their inner ends at I, to the hub D, are a series of straight spring arms J, one of which arms is adapted for each friction pawl and are arranged in a line therewith, so that their outer free ends can be thrown at one side of said pawls and form spring stops therefor, which prevent the pawls from falling back at that side and cramping on the circular flange. Now it will be readily seen that as the shaft is revolved in one direction the pawls rest against the outer ends of the springs J, and travel freely over the flange C, thus allowing the disk or wheel B, to be loose on the shaft and not carried therewith in that direction. As the shaft turns in the other direction, the pawls G, are instantly forced away from their spring supports, and therefore cramp tightly onto the circular flange C, so as to carry around the disk or wheel or whatever attachment the circular flange may be on, with the shaft. By throwing the outer free ends of the springs J, to the opposite sides of the pawls as shown in dotted lines, the support therefor is changed to their opposite sides, thereby providing means for the reversal of the operation of the clutch mechanism.

From the foregoing it is thought that the construction, operation and many adaptations of the herein described clutch are apparent without further description.

Changes in the form, proportion and the minor details of construction may be resorted to without departing from the principle or sacrificing any of the advantages of this invention.

Having thus described my invention, what I claim, and desire to secure by Letters Patent, is—

In a clutch, the shaft, a circular hub fixedly mounted on said shaft and provided with a series of rounded peripheral bearing notches, a disk or wheel loosely mounted on the shaft alongside of the circular hub and provided at one side with a circular flange inclosing the circular hub, a series of friction pawls having inner rounded bearing ends registering in the rounded bearing notches of the hub to prevent displacement and with slightly curved notches or grooves in one edge adapted to loosely embrace the circular flange of said disk or wheel, and straight spring arms secured fast at their inner ends to one face of the circular hub and adapted to have their other outer ends sprung to either side of said friction pawls, substantially as set forth.

In testimony that I claim the foregoing as my own I have hereto affixed my signature in the presence of two witnesses.

JOHN H. COX.

Witnesses:
R. L. STURGES,
J. K. GLASSCOCK.